July 22, 1958
D. J. GREEN
2,844,817
LANDING TRAFFIC CONTROL SYSTEM
Filed Feb. 18, 1952
3 Sheets-Sheet 1
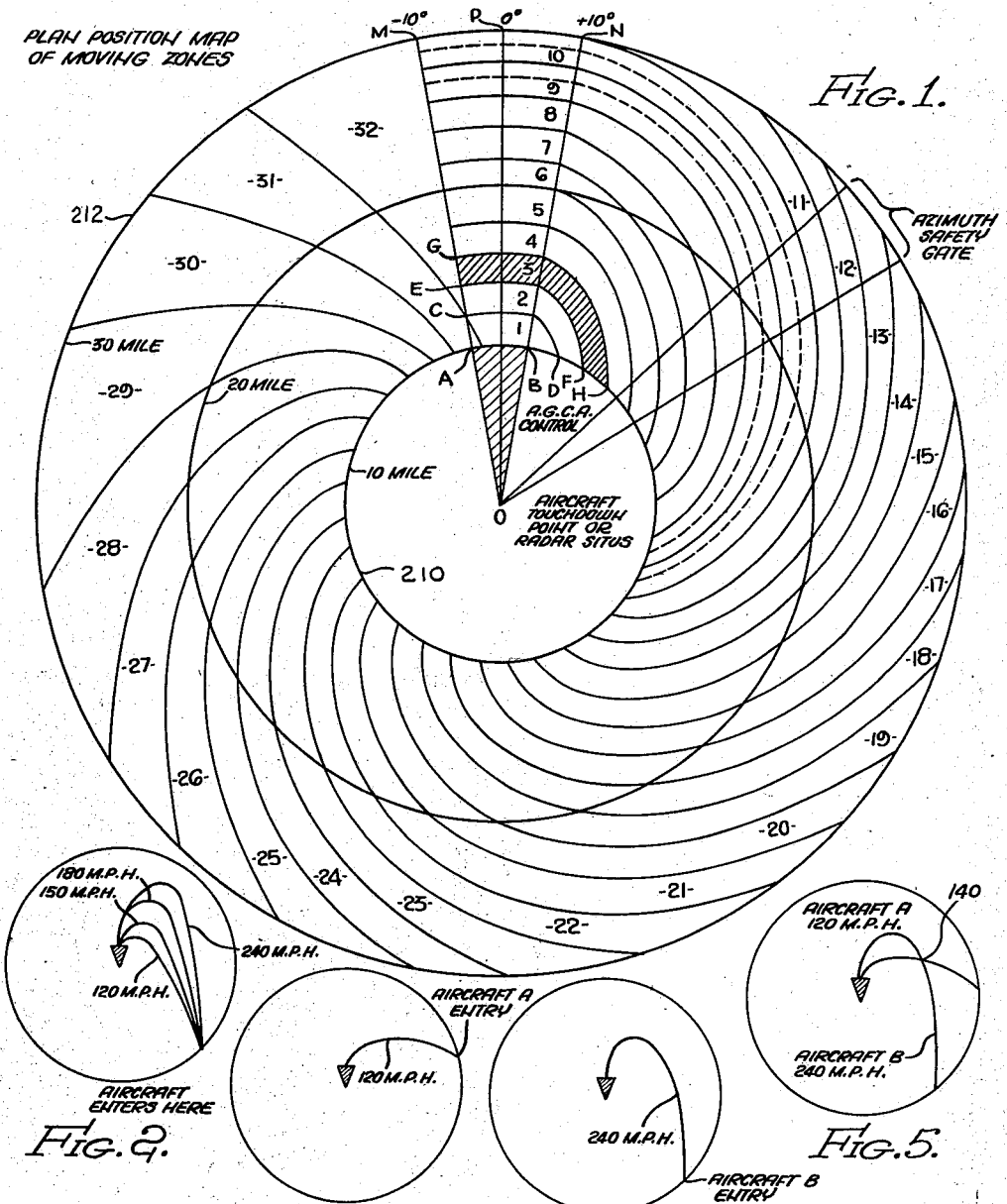
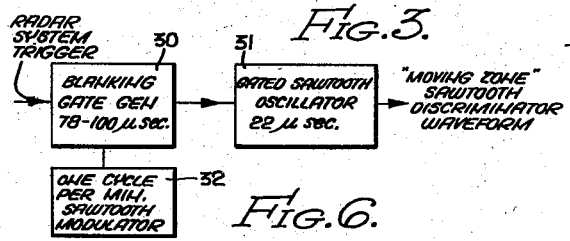
INVENTOR,
DAVID J. GREEN
BY
Lyon & Lyon
ATTORNEYS

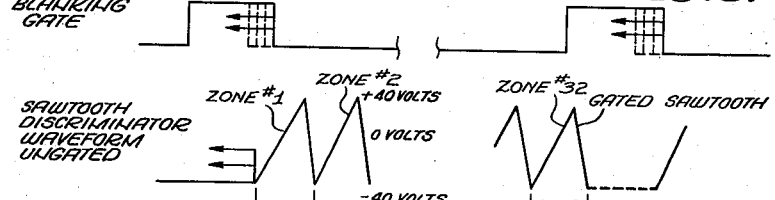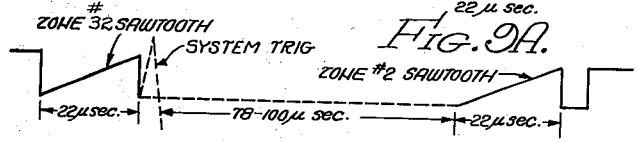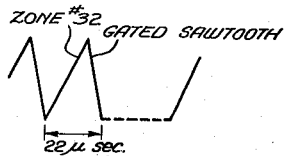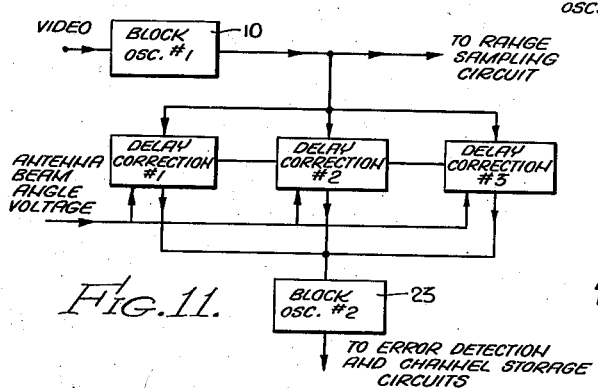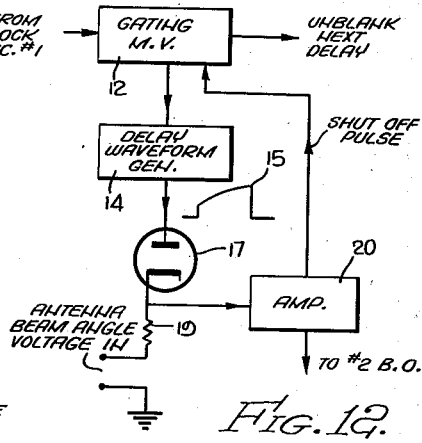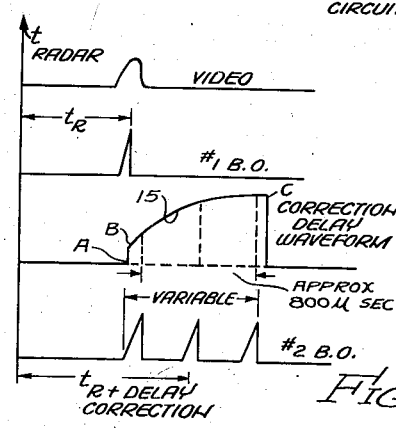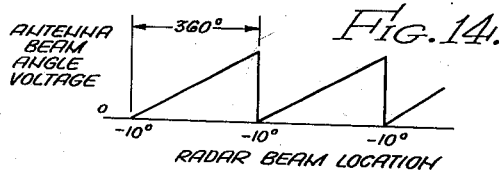

July 22, 1958

D. J. GREEN 2,844,817

LANDING TRAFFIC CONTROL SYSTEM

Filed Feb. 18, 1952

INVENTOR,
DAVID J. GREEN
BY
Lyon & Lyon
ATTORNEYS

United States Patent Office 2,844,817
Patented July 22, 1958

2,844,817

LANDING TRAFFIC CONTROL SYSTEM

David J. Green, Pacific Palisades, Calif., assignor to Gilfillan Bros., Inc., Los Angeles, Calif., a corporation of California Application February 18, 1952, Serial No. 272,140

12 Claims. (Cl. 343—112)

The present invention relates to means and techniques for controlling a plurality of aircraft so that the same may be landed safely, efficiently and with adequate and optimum time spacing between such aircraft.

In the process of directing and controlling the landing of a plurality of aircraft, which are coming in for a landing, either in a GCA (ground controlled approach), AGCA (automatic ground controlled approach), or a conventional landing system, it is desirable that the various aircraft be assigned a certain order in which to land with adequate time spacing between the various aircraft.

This schedule, or order of landing, is usually determined by an operator in the control tower who, through communication with the pilot, conveys information as to when the pilot is to enter the approach area to the landing field. In such arrangement, the order in which the aircraft land, lies solely in the judgment of the control tower operator and he may, in exercising his judgment, overlook such factors as the bearing angle of the aircraft, and its speed with respect to the bearing angle and speeds of other aircraft, with the result that the aircraft may not be landed efficiently and may not have adequate and optimum time spacing.

In accordance with the present invention, there is provided, a long range time programing control for automatically realizing the desirable features mentioned above.

In the control system described herein, a landing traffic control system functions generally to detect the arrival of each aircraft into the surveillance area, (i. e., that circle about the landing field in which a P. P. I., plan position indicator system is effective to develop radar information) and to control the flight of the aircraft by right and left banks to deliver the same into the operating range of the GCA or AGCA equipment, such range being in the order of 10 miles from the aircraft's touchdown point.

Each aircraft, as a function of its range and bearing, is automatically assigned a predicted time of arrival into the AGCA system. This predicted time of arrival is an advance reservation on the landing facility and assures adequate spacing from the preceding and following aircraft. The control system programs the flight of each aircraft so that a predicted time of arrival is fulfilled and, in the operation of such system, the control tower operator is informed by a series of lights of the number of incoming aircraft in the area and their position in the landing schedule.

To effect these results, each position in the aircraft landing program is represented by a range zone, in the form of a single sawtooth wave. These zones represented by such sawtooth wave, move continuously at some reasonable flight speed toward the entrance to the AGCA runway.

An aircraft entering the aforementioned surveillance area which extends, for example, 30 miles from the touchdown point, is assigned to one of the moving zones, depending upon the position of such aircraft in its initial entrance into the surveillance area. The aircraft, in such case, is the only aircraft in the zone and its arrival into the range of the AGCA landing system is determined by the time interval corresponding to that particular zone.

On each scan, the surveillance radar provides data as to the aircraft's position. The data obtained from each aircraft is compared with the center of its associated range zone, i. e., sawtooth wave, to determine the errors in the time schedule. Correction for these errors is telemetered to the aircraft in the form of right or left turn command signals. These turn signals are used to control the radial component of the aircraft's velocity. The control signals are indicated on conventional cross pointer meters, or are applied directly to the autopilot of the aircraft.

The proposed system provides a high order of navigation safety. The system also provides anti-collision safety zones which surround each control area with means which prevent overlap of aircraft in the safety zones. The system herein is relatively simple, since the aircraft is not required to follow a prescribed course and thus, complex calculation of curved flight paths is rendered unnecessary.

An object of the present invention is therefore to provide an improved landing traffic control system of this character, for accomplishing the aforementioned desired indicated results.

A specific object of the present invention is to provide a system of this character, which is automatic in nature, to deliver aircraft, with adequate and optimum time spacing, to the entrance of an aircraft landing area.

Another specific object of the present invention, is to provide an improved system of this character, in which each aircraft, as a function of its range and bearing, is automatically assigned a predicted time of arrival.

Another object of the present invention is to provide a system of this character, which is universally applicable, not only to AGCA or GCA systems, but also to present day more conventional landing systems.

Another specific object of the present invention is to provide a system of this character, in which moving zones are effectively produced which travel at a predetermined uniform rate, towards the entrance of a landing area, and correction signals are automatically transmitted to the aircraft of such nature that the aircraft tends to remain in the center of such zones.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 serves to represent the circular area within 30 miles of the aircraft touchdown point, as monitored by the conventional search or surveillance radar and serves also to indicate a sector, indicated by hatching where the AGCA control is effective; and further, such figure serves to indicate 32 zones which effectively travel at a uniform speed towards the entrance of the hatched area.

Figures 2, 3, 4 and 5, in conjunction with Figure 1, serve to illustrate the flight of different aircraft flying at different speeds and entering the surveillance area at different points.

Figure 6 is a block diagram representing circuitry for producing sawtooth waves representing the moving zone, such sawtooth waves being "moved" by the modulator shown in such figure to produce moving "saw-tooth waves."

Figures 7, 8, 9A, 9B show interrelated wave forms obtained, using the apparatus illustrated in Figure 6, and in block diagram form in Figure 15.

Figure 9C shows a pair of time spaced sawtooth waves each representing adjacent zones in Figure 1 produced by the apparatus illustrated in Figures 6 and 15.

Figure 10 illustrates a wave produced on differentiation of the sawtooth wave illustrated in Figures 9B and 9C, such differentiating wave form being used to control a ring counter for purposes of data channelizing.

Figure 11 is a block diagram representing certain apparatus for obtaining a pulse which serves to represent the so-called corrected range of the aircraft, taking into consideration its bearing angle.

Figure 12 represents circuitry forming one of the three delayed correction networks illustrated in Figure 11, it being understood that the other two delayed correction networks are identical with that network illustrated in Figure 12.

Figure 13 shows certain wave forms useful in explaining the operation of the apparatus shown in Figure 12.

Figure 14 represents a sawtooth wave, which is actually the antenna beam angle voltage, the magnitude of such angle voltage being representative of the angular position of the antenna beam in space. Such voltage is produced as indicated in Figure 15.

Figure 15:
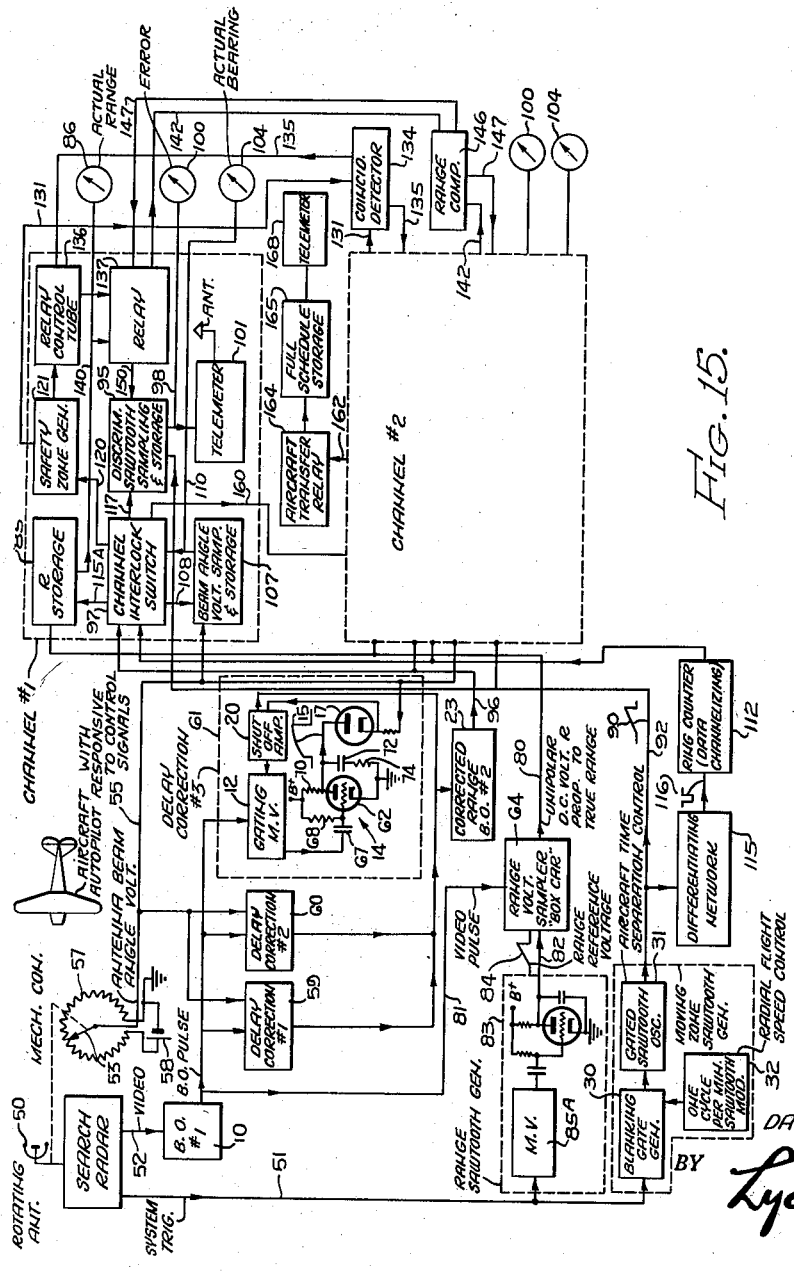

Figure 15 serves to illustrate apparatus and its functional relationship in a system of this character. Figure 15 is essentially a block diagram and incorporates apparatus disclosed in the previous figures.

In Figure 1, the 32, artificially created, zones represented therein occupy the space between the ten mile circle 210 and the 30 mile circle 212 continuously move, in a counterclockwise direction, in towards the arc AB which defines the entrance to the AGCA control area, which is represented by the hatched triangle OAB. Each zone is defined by a pair of curved boundary lines. For example, zone 3 is defined by the area between curved lines EF and GH and represented by the hatched area between such lines. All of these zones move simultaneously so that, for example, the area represented by zone 3 in Figure 1 is subsequently occupied by zone 4, then zone 5, then zone 6, etc. with zone 3 likewise moving into the area represented by zone 2 then into the area represented by zone 1. It is noted that one side of each zone is defined by an arc on the 10 mile circle 210 and the other side of each zone is, in the case of zones 1–10, defined by a portion of line AM. These zones effectively move such that the curved line CD, which represents the boundary of zone 1, merges and is coextensive with the line AB; likewise, the curved line EF, which represents the boundary of zone 2, subsequently merges and becomes coextensive with the line AB; likewise, the curved line GH, which represents the boundary of zone 3, merges and becomes coextensive with the line AB, etc., with respect to the other zones 4–32 both inclusive. Each of the zones is intended to be occupied by only one aircraft which is intended to be maintained midway between the two curved lines of the artificially created zone, for example, the line EF on the one hand and the line GH on the other hand. Since the aircraft, of course, moves the zone occupied by the aircraft is represented as moving at the same speed as the aircraft therein, i. e., an average speed for all aircraft in the system.

Actually, each of the 32 zones represent a corresponding one of a train of sawtooth waves and such train of sawtooth waves has a motion imparted thereto representative of a reasonable flight speed of an aircraft, as described later in connection with Figures 6 and 15.

It is noted that Figure 1 includes a sector OMN. Such sector includes the sector OAB. The sector OMN is thus defined by a pair of radial lines OM and ON, which are displaced −10° and +10° from the center line OP. An aircraft position on the line OP has a zero bearing angle and no correction signals in the nature of right or left turn signals are required to be transmitted to the aircraft (assuming that the speed of such aircraft in its flight along the line OP is equal to the speed at which the zones converge at the line AB).

In the event that the speed of the aircraft is greater than the speed of zone travel, correction signals, under certain conditions, are nevertheless transmitted to the aircraft in the nature of right or left turn signals, so that the radial component of the aircraft speed is equal to the zone speed. Thus, essentially, right and left turn control signals are imparted to an aircraft in a system of this character, for purposes of controlling the radio component of its speed.

It is apparent that an aircraft entering the area outside of the sector OMN must be allowed additional time to circle into the runway bearing. The method of adding this time as a function of bearing, is illustrated hereinafter, in more detail, in connection with Figures 11, 12 and 13.

As described above, the sum of the factors involving aircraft range and bearing from runway, determines the time position of the aircraft. To conform with the time position for a particular zone, the aircraft has an equivalent range along the runway extension, i. e., generally along the line OP (Figure 1), or its position is represented by a corrected range pulse in the manner described later.

This is illustrated in connection with Figure 1 wherein it is observed that the 2 mile spacing along the line OP for one aircraft extends to a spiral area, the center of which constitutes the locus of all points that satisfy the predicted arrival time. These 32 zones constitute a "coaxial spiral" all of which dynamically contract at a uniform rate toward the end of the AGCA glidepath AB. The precise spiral shape is determined by the wave form 15 (Figure 12), developed, as described later in the delay wave from generator 14.

Thus, aircraft entering the pattern of Figure 1 at large angles from the line OM will seek a path along which its velocity will satisfy the desired time position. The dynamics of the control system has an action analogous to a centrifuge; fast moving aircraft which have large initial bearing angles are held out near the periphery where the path is long; slower aircraft are pulled inward for shorter paths. The variation of flight path with flight speed is illustrated in connection with Figures 2, 3, 4 and 5. Inbound aircraft are kept out of the 10 mile radius circle, except in the sector OMN, by a ground system request for increased airspeed or "sliding" the aircraft into "later" zones. This problem arises where the aircraft is below the minimum approach airspeed, assumed herein to be 120 miles per hour.

It is observed that the area of control is the area covered by the surveillance or search radar from which it extracts its data.

For purposes of illustration, the characteristics of the surveillance radar is assumed to develop pulses at the rate of 1500 per second, the maximum range is 30 miles, and the antenna scan rate is 20 per minute.

The desired spacing of an aircraft is one minute with the aircraft approaching at 120 miles per hour. This condition calls for aircraft spaced two miles apart, if all are in line with the line OP. The radar time separations is:

$$f_{radar} = .18 \, V_p T_{sep}.$$

Where $t_{radar}$ is equal to the radar time separation of the aircraft expressed in microseconds, $V_p$ is the velocity of the aircraft, and $T_{sep}$ is the desired time separation of landing aircraft expressed in minutes. With these system parameters, this constitutes a period of approximately 22 microseconds. These parameters are arbitrary of course; any others may be used, the only limitations being the radar and the aircraft.

The minimum control range of the system may be arbitrarily set at 10 miles. The method of generating an electrical quantity, i. e., sawtooth waves, representative of the endless chain of zones moving inwardly at a 120 miles per hour rate, is illustrated in connection with Figure 6. The radar system, as is well known, serves to develop and radiate electromagnetic pulses in timed relationship and in accordance with what is termed the system trigger. The system trigger is illustrated in Figure 7. This system trigger is applied also to the blanking gate generator 30 over lead 51 to initiate a blanking delay with a period corresponding to, for example, a 10 mile range. The aforementioned radiated pulses impinging on an aircraft in the irradiated space produces an echo which returns to the radar system in the form of a video signal. The purpose of this blanking gate generator 30, in general, is to produce control signals only for aircraft which are beyond the ten miles mentioned above. The length of such blanking period, is continuously and cylindically varied as illustrated by the series of vertical dotted lines in Figure 8 representing the trailing edge of the blanking gate. This cyclical variation is at the rate of one cycle per minute is produced by the one cycle per minute modulator 32, which as indicated in Figure 8, serves to terminate the blanking gate at different times ranging from 78 to 100 microseconds as indicated in Figure 6. During this blanking period a normally free-running sawtooth generator or oscillator 31 is interrupted as indicated also in comparing Figures 8 and 9A. Immediately at the end of the blanking period as represented by one of the vertical dotted lines in Figure 8, the sawtooth oscillator 31 is rendered operative to develop a series of sawtooth waves, each cycle or wave of which is illustrated in connection with Figure 9C. Each sawtooth wave has a duration of 22 microseconds and the first one of the series of sawtooth waves illustrated in Figures 9A and 9B is initiated by the trailing edge of the blanking gate as indicated by the arrows in Figure 9A corresponding to the arrows in Fig. 8. Each sawtooth wave form represents one of the range zones previously discussed. The center of each sawtooth wave represents a position in the landing schedule the first sawtooth wave representing zone 1, the second, zone 2, etc.; it is therefore evident that the number of aircraft that may be simultaneously controlled is limited by the radar repetition rate, in accordance with the following formula:

$$\text{Max. No. of aircraft} = \frac{\frac{10^6}{PRF} - 100}{t_{radar}}$$

With a pulse repetition frequency (PRF) 1500 per second, the maximum number of aircraft, or zones, is 25. The number of zones may be increased by decreasing the pulse repetition frequency in general, or by using the time between a plurality of radar frames. It is assumed that the pulse repetition frequency allows 32 zones as illustrated in Figure 1.

As indicated above, the blanking delay imposed by the gating generator 30 is rendered variable by the one cycle per minute sawtooth modulator stage 32, which serves to cyclically reduce the delay from 100 microseconds to 78 microseconds. Thus, when the 9 mile blanking delay, corresponding to 100 microseconds, is reduced on successive cycles until the delay corresponds to 7 miles or 78 microseconds, the train of sawtooth waves are generated progressively earlier as a group and all of the zones represented thereby move forwardly 2 miles. Thus, linear sawtooth modulation of the blanking delay at a one cycle per minute rate, moves the train of sawtooth waves developed in stage 31 inwardly at a uniform rate corresponding to 120 miles per hour. The moving zone sawtooth generator thus includes the designated stages 30, 31 and 32 in Figure 15.

In the system herein, the radar data from an annular ring between 25 and 30 mile range is continuously monitored for the entrance of aircraft into the surveillance area. Each approaching aircraft, upon detection, is assigned to one of the zone intervals. The zone assignment is a function of azimuth bearing, as well as range, as indicated above.

The position of the aircraft in a particular zone is determined by sampling the sawtooth wave form on each observation of the aircraft. An aircraft in the center of the zone would sample zero volts. Any other position results in a voltage, the sign and magnitude of which define the error in time position. This error signal is converted to a telemetered command to the aircraft, such that an aircraft flying at any speed greater than the required minimum of 120 miles per hour, is made to satisfy a predicted arrival time, by ground controlled right and left turns only. This is accomplished by adjustment of the heading of the aircraft so that the velocity vector has the desired radial component, the tangential component being allowed to have any reasonable value. It may be advisable that the ground control should telemeter a suggested airspeed so that the aircraft may fly an economical course. This, however, is not a requirement of the system.

Some control over elevation is required to place the aircraft on the end of the AGCA glidepath on the line AB. The desired path in elevation may be a continuous, uniform rate of descent over the control period, perhaps equivalent to an extension of the glidepath elevation angle.

Information for this type of control is available from the range position. In a radar capable of delivering elevation data, this function may be made automatic because of the closed-loop servo characteristic available. In radar systems without elevation information, an interim method consists of telemetering a suggested elevation as a function of remaining time to arrival.

More specifically, with reference to the block diagram of the system illustrated in Figure 15, the search radar includes a continuously rotating antenna 50, which has an antenna scan rate of 20 per minute. The search radar system develops a system trigger which is applied to lead 51 and video echoes from aircraft in the surveillance area appears on lead 52.

The antenna beam angle voltage, illustrated in Figure 14 and appearing on lead 55, is obtained by mechanically fixing the rotatable arm 53 to the rotating antenna 50 so that such arm 53 rotates in synchronism with the rotating antenna. The arm 53 sweeps over the circular resistance 57 which has opposite terminals thereof connected to the direct current voltage source 58. The arm 53 is connected to the lead 55 and one terminal of source 58 is grounded so as to develop the voltage wave illustrated in Figure 14. The video on lead 52 is applied to the input terminal of the blocking oscillator stage 10 (Figures 15 and 11). The output pulse from stage 10 is applied on the one hand to the three delay correction networks 59, 60 and 61 and, on the other hand, to the range voltage sampler stage 64.

In general, the occurrence of an airplane echo in the radar video data on lead 52 causes the blocking oscillator 10 to be fired. The resulting blocking oscillator pulse initiates operation of a gating multivibrator stage 12, which, in turn, causes operation of the delay wave form generator 14, which serves to develop a wave form of the character illustrated at 15 in Figures 12 and 15. This wave form 15 is applied to the anode of a diode 17, which is biased by the beam angle voltage applied between the cathode of such diode and ground through resistance 19. The beam angle voltage, developed as described above, constitutes a saw tooth wave as illustrated in Figure 14, the instantaneous magnitude of which represents the angular position of the radar antenna beam.

It is observed that this saw tooth voltage is 0 at −10 degrees and increases linearly with increasing clockwise bearing. The time of conduction of the diode 17 is thus the range time, plus a delay time, referred to as the theta delay time, or delay correction. Upon conduction of the diode 17, the voltage developed on the cathode of the diode 17 is amplified in the amplifier stage 20 and used to shut off the gating multivibrator stage 12. The amplifier stage 20 serves also to apply a pulse to a second blocking oscillator stage 23. The output of the blocking oscillator stage 23 is thus a pulse, or trigger, which is delayed in time with respect to the system radar trigger, in an amount representative of the range of the aircraft, plus an amount representative of the bearing of the aircraft with respect to line OM. This so-called corrected pulse is used in the manner described more in detail hereinafter.

The operation of the stages 59, 60 and 61 is described herein above in a general manner, with respect to Figure 12; however, the specific form of the delay wave form generator 14 is now described in detail.

The delay wave form generator 14, which serves to supply a correction factor representative of the bearing of the aircraft, constitutes a triode 62 which has its cathode grounded and its control grid connected to the gating multivibrator stage 12 through condenser 67.

The control grid of tube 62 is connected to a positive ungrounded terminal of a voltage source (B+) through resistance 68. Such terminal of voltage source is connected to the anode of tube 62 through resistance 70. A serially connected condenser 72 and resistance 74 is connected between the anode of tube 62 and ground.

The generator 14 thus serves to develop the delay wave form 15 (Figure 13), which has a step AB, determined by the magnitude of resistances 70 and 74, and such wave form has a non-linear rising portion BC, determined by the time constants of the circuit including resistances 70, 74 and condenser 72 in relationship to the character of the wave developed by the gating multivibrator stage 12.

It is observed that three delay correction networks 59, 60 and 61 are provided so as to obtain data with respect to three aircraft, which may have the same bearing angle but which may be separated in range. For present purposes it may be assumed that only one of such delay correction networks is being used.

It is desirable for purposes of instrumentation and for purposes of developing suitable control signals, to produce certain unipolar direct current voltages in the present system, and for that purpose a conventional sampler of the character illustrated at 64 is provided. Such sampler may be of a well-known "box car" type, in which a unipolar output voltage is developed on lead 80 having a magnitude determined by the particular coincident condition existing between an input pulse, i. e., video pulse applied to lead 81, and a sawtooth reference voltage applied on lead 82. The video pulse is supplied from the output of blocking oscillator stage 10. The sawtooth reference voltage 84 is developed in the range sawtooth generator stage 83 as a result of system triggers applied to the multi-vibrator stage 85a. The sawtooth wave 84 starts substantially from a low value at the time of the system trigger and increases in magnitude thereafter. When the video pulse appears on lead 81 a short time after the system trigger a relatively low D. C. voltage is developed on lead 80; and when the video pulse occurs a relatively long time after the same trigger a relatively large D. C. voltage is developed on lead 80. The voltage on lead 80 is thus a unipolar direct current voltage referred to as voltage R, proportional to the true range of the aircraft. This voltage R is applied to an R storage stage 85 in each control channel. The R storage stage 85 comprises essentially a condenser and the voltage on such condenser is applied to a volt-meter 86 which indicates the true range of the aircraft.

Sawtooth waves 90 each representing a zone as indicated in Figure 9c are developed on the lead 92, using the means described briefly in connection with Figure 6, such means being shown also in Figure 15 and indicated by the same reference characters. These sawtooth waves 90 are applied to a sampling stage 95 in each of the channels as an input voltage and is sampled by the corrected range pulse developed on the lead 96, i. e., at the output of the corrected range blocking oscillator stage 23. The stage 95 circuitwise is actually a sawtooth sampling and storage stage similar to the combined stages 64 and 85. This sampling, of course, occurs when the channel interlock switch 97 is in its "closed" condition, allowing passage of the corrected data range pulse to the stage 95. This interlock switch 97 is sequentially operated in a manner described below in sequence so that the different channels are sequentially supplied with data. As a result of the sampling of stage 95, i. e., as a result of comparison of the sawtooth 90 with the range pulse appearing on lead 96, a direct current bipolar voltage is developed on lead 98. The stage 95 may be of the so-called "box car" type, the function and operation of which is described above in connection with stage 64, namely, stage 95 serves to compare the time of occurrence of pulse or gate with respect to the instantaneous magnitude of a saw tooth wave and to produce a uni-polar voltage which is a result of the comparison of such pulse with the instantaneous magnitude of the saw tooth wave. This bipolar voltage is zero when the corrected range pulse occurs in the center of the sawtooth wave and has plus or minus values depending upon whether or not the corrected range pulse occurs before or after a time corresponding to the center of the sawtooth waves. This voltage on lead 98 is indicated on the meter 100 which serves thus to indicate the error or deviation of the aircraft with respect to the center of the zone. This lead 98 is also used for example, to modulate a transmitter in the apparatus designated by the telemeter stage 101, for purposes of transmitting to the aircraft information with respect to its position in its assigned zone. Such correction signals, after reception and demodulation in the aircraft are applied to the auto-pilot of the aircraft to cause the aircraft to make right or left turns in accordance with the positive and negative voltages appearing on lead 98. When such a voltage on lead 98 is zero the aircraft is not banked. It is recalled that the purpose of banking of the aircraft is for the purpose of controlling the radial component of the speed of the aircraft, with respect to the point O in Figure 1. A true bearing of the aircraft is indicated on meter 104 and is obtained using a similar sampling technique. The sampling stage 107 has applied thereto as input voltages, the antenna beam voltage indicated in Figure 14, i. e., a sawtooth voltage and a gating voltage over lead 108, such gating voltage being representative of the range of the aircraft. The stage 107 is actually a sampling and storage stage and serves to develop a unipolar direct current voltage on lead 110 connected to the meter 104. The stage 107 may be of the so-called "box-car" type, the function and operation of which is described above in connection with stages 64 and 95. The voltage on lead 110 is also applied to the channel interlock switch 97 for purposes described later.

In order to provide sequential operation of channels 1, 2, etc., in sequence to receive data unique to such channel or zone, a conventional ring counter 112 is used to supply in sequence pulses to the various channel interlock switches 97 for purposes of "closing" such switch 97 when a time has arrived for the corresponding channel to accept data with respect to aircraft in the corresponding zone. For this purpose the sawtooth wave 90 is applied to the differentiating network 115 for producing differentiated pulses 116 of the character illustrated in Figure 15 and in Figure 10. Such pulses 116 operate the counter 112 and the counter 112 in turn operates the switches 97 in sequence. In other words, the function of the ring counter 112 is to condition only one channel to receive data at one particular time and in sequence. Ring counters of this character, which may be used for this purpose, are as described in "High Speed Computing Devices" by McGraw-Hill, 1950. Thus, the ring counter 112 may, as described on page 20 of "High Speed Computing Devices," have five stable states, and each of which one, and only one, tube is conducting. The channel interlock switch 117 in each of the channels may, for example, comprise a tube or simple switch as described in "High Speed Computing Devices," sensitive to that particular tube in the ring counter which may be conducting, to allow that particular channel interlock switch to be "closed" whereby the corresponding channel is rendered receptive to the data appearing on lead 96. Different forms which channel interlock switch 97 may take and its cooperation with its ring counter 112 are discussed in the aforementioned publication "High Speed Computing Devices." Upon operation of the switch 97 the R storage stage 85 is rendered receptive to the voltage appearing on lead 80, a gating voltage being supplied over lead 115A for that purpose; similarly, the corrected range pulse appearing on lead 96 is applied over lead 117 to the aforementioned stage 95, and a gating voltage is supplied over lead 108 to the stage 107.

In order to realize certain safety features a corrected range voltage pulse is supplied over lead 120 to the "safety zone" generator 121.

There is a safety zone generator 121 in each channel serving to develop a gating voltage, a so-called guardian gate, which is applied over lead 131 to a coincidence detector stage 134. The range of such gate corresponds to an azimuthal safety gate of approximately 15 deg. as indicated in Figure 1. The purpose of the coincidence detector 134 is to develop a control voltage on lead 135 when there is an overlap in safety gates produced in adjacent zones or channels. When there is an overlap the control voltage developed on lead 135 is applied to the relay control tube 136 to cause actuation of the control relay 137. When this occurs the range voltage on lead 140 is applied to lead 142 and to the range comparator stage 146. The range comparator stage serves to compare D. C. voltages by subtracting one from the other and applying the difference voltage to a network responsive either to plus or minus voltages above a voltage level. Such voltage is applied as a control voltage over leads 147 and relay 137 and lead 150 and to the telemeter stage 101 as a control signal for maximizing the separation of aircraft considered too close both in azimuth and in range.

It is noted from the above description that each aircraft under control is surrounded by a safety zone in both range and in azimuth and that a safety gate for 15 deg. of azimuth scan follows each observed aircraft. If another aircraft is observed in the duration of the safety-gate an anti-collision circuit is activated. The anti-collision circuit will compare the range voltages of the two aircraft in the range comparator stage 146 and in the event that the range voltages are within 10% of the voltage corresponding to maximum range, the aircraft are automatically turned apart. The aircraft having a smaller range voltage is turned inwardly, the other outwardly. This divergence continues until the minimum range separation requirement is satisfied.

In a system of this character the safety zones are compared to maintain a three mile separation in range and 2½ miles (at ten-mile range) or greater tangential separation. It may be stated emphatically that collision danger between inbound aircraft does not exist when the aircraft respond properly to ground control, though crossed flight paths do occur. The paths of aircraft A and B in Figures 3, 4 and 5 show such a cross-over at point 140. If aircraft A and B are in adjacent channels or zones they are not permitted to share; then in such case aircraft A passes the cross-over point 140 one minute prior to the arrival of aircraft B.

The present system in contemplating efficient handling of aircraft allows aircraft in a later zone to fly into an earlier zone and be controlled therein provided, of course, that the earlier zone is not occupied by a different aircraft. For this purpose there is developed on lead 160 a continuous voltage for purposes of indicating the occupancy of channel 1 when such is the case. This control voltage serves to assure the operation of channel 2, and in such instance channel 2 takes the aircraft under control and prevents flight of the aircraft into channel 1. In the event that channel 1 is not occupied a control voltage is not present on lead 160 and thus channel 2 is made ineffective to retard the flight of the aircraft and it continues through channel 2 into channel 1.

In the event that an aircraft enters the system with range and bearing such as to demand the assignment of an occupied channel or zone, then such condition is indicated by a control voltage applied to the aircraft transfer relay 164 for actuating the full schedule storage stage 165; and when this occurs this condition is telemetered using the telemeter stage 168 to the aircraft.

With respect to protection against collision with outbound aircraft in a system of this character the following different methods are proposed:

The first method involves elevation separation. Since the elevation of the end of the AGCA glide-path at ten miles is paproximately 2750 ft. outbound aircraft can be required to have an elevation of 3750 ft. or more, and thereafter be required to climb at some minimum angle to keep above the elevation assigned to inbound aircraft. This initial elevation requirement may be achieved by circling, if necessary, in the fan sector, where the range is equal to two to eight miles and the azimuth angle equal to 90 to 270 deg.

A second method proposed involves use of a so-called azimuth corridor. In such case the approach pattern is modified so that aircraft entering the area with an azimuth angle less than 180 deg. circle counter-clockwise, while the aircraft with an azimuth angle greater than 180 deg. go clockwise.

Thus a corridor between the limits of 175 deg. and 185 deg. is kept clear of inbound aircraft out to a 25 mile range. The outbound aircraft in such case are required to hold a runway heading until passing the fan marker at a range of 25 miles.

A third method proposed for preventing collision with outbound aircraft involves the use of safety-gates around inbound aircraft. The safety-gate around aircraft extends plus or minus 7½ deg. fore and aft. If any uncontrolled aircraft is detected in the azimuth safety-gate its range and azimuth bearing angle is sampled. The range voltage is compared to proximity of the aircraft and the controlled aircraft is given a heading to increase the separation in either range or bearing.

A fourth method involves a system similar in all respects to the inbound traffic system described above in detail. For the split type of landing pattern, aircraft could fly straight out the runway extension, or if flying at an appropriate speed, could veer either right or left and exit from the rear at any bearing.

As mentioned above, aircraft arriving when the landing scheduled is full, is held off until an open zone is available. A continuous right or left signal keeps the aircraft circling in its immediate vicinity ready to be picked up for inbound flight. Special channels could be used for this purpose to establish priority and to insure adequate spacing.

It is noted that in a system of this type all targets coming within the control of the system are examined with respect to noise pulses, rain or cloud return, as well as with respect to aircraft that do not respond to control. The noise and rain signals may be eliminated by requiring several radar hits per scan before the target is recognized as such. Aircraft that do not comply with control signals develop and maintain error voltages. An integrating network may be used to detect continual errors and to actuate an alarm. The derivative or change in error voltage may be used to bias the alarm threshold sensitivity so as to act more rapidly on increasing errors. The alarm would alert the tower operator, who would determine the range and azimuth angle of the uncontrolled aircraft as well as the position of other aircraft in the vicinity. Normal communicating channels are used to talk the pilot into the AGCA area where this system is effective.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described means deriving an electrical quantity representing a moving zone in space, means deriving a video echo signal from aircraft in said zone, and means comparing said video signal with said electrical quantity for deriving a control voltage, and means for controlling the flight of said aircraft in accordance with said control voltage developed by said comparing means to maintain said aircraft in a predetermined position in said zone.

2. In a system of the character described, means producing an electrical quantity representing a zone, means modifying said electrical quantity as a function of time to represent movement of said zone, means deriving a video echo signal from an aircraft in said zone, and means comparing said video electrical signal with said electrical quantity for deriving a control voltage, and means for controlling the flight of said aircraft in accordance with said control voltage developed by said comparing means to maintain said aircraft in a predetermined position in said zone.

3. The arrangement set forth in claim 1, in which said video echo signal is effectively delayed in increasing amounts depending upon increasing bearing angle of said aircraft.

4. In a system of the character described, means deriving an electrical quantity representing a moving zone in space, means deriving a video echo signal from an aircraft in said zone, means for delaying said video echo signal in increasing amounts in accordance with increasing bearing angle of said aircraft, means comparing said delayed video signal with said electrical quantity to obtain the position of said aircraft in said zone, and means controlling the flight of said aircraft in accordance with a control signal developed by said comparing means.

5. In a system of the character described means producing an antenna beam rotating through space, means deriving an antenna beam voltage representative of the angular position of said antenna beam in space, means including said rotating antenna beam, for deriving a video echo signal from an aircraft in said space, means delaying said video echo signal an amount dependent upon the bearing of said aircraft, means deriving an electrical quantity representing a moving zone in space, means comparing said delayed video signal with said electrical quantity to derive a control voltage representative of the position of said aircraft in said zone, and means controlling the flight of said aircraft in accordance with said control voltage developed by said comparing means.

6. In a system of the character described, means deriving a plurality of electrical quantities, each representative of the range of a corresponding aircraft, means deriving a plurality of second electrical quantities, each representative of the bearing angle of a corresponding one of said aircraft, means comparing said second electrical quantities to produce a control voltage when the difference in bearing angle between the two aircraft is below a predetermined minimum, means responsive to said control voltage for comparing said first electrical quantities and for producing a second control of voltage when the difference in range of said aircraft is within a predetermined minimum.

7. In a system of the character described, means deriving a plurality of first electrical quantities, each representative of the range of a corresponding aircraft, means deriving a plurality of second electrical quantities, each representative of the bearing angle of the corresponding one of said aircraft, and first comparing means for comparing said first electrical quantities, second comparing means for comparing said second electrical quantities, and means coupled to said first and second comparing means for producing a control voltage when the difference in bearing angle of the two aircraft and also the difference in range of said two aircraft, as determined by said first and second comparing means, are both below a predetermined minimum.

8. In a system of the character described, means producing an antenna beam rotating through space, means producing an antenna beam angle voltage, the magnitude of which is representative of the angular position of said antenna beam in space, means including said antenna beam for producing video echo signals from a plurality of aircraft in said space, means for delaying said video echo signals in an amount dependent upon the bearing angle of said aircraft, means deriving a train of electrical quantities each representing a particular zone, means modulating said train of electrical quantities to impart a movement to the zones represented by said electrical quantities, a plurality of control channels, one for each zone, switching means operated in timed relationship with said electrical quantities to render a corresponding channel effective to receive sequentially said delayed video signal, and a corresponding one of said electrical quantities, means in each one of said control channels including means for comparing the delayed video signal with a particular electrical quantity transferred to that control channel to derive a control voltage representative of the position of the aircraft in the zone.

9. The arrangement set forth in claim 8, in which each of said control channels includes means for deriving an electrical quantity representative of the range of bearing of the corresponding aircraft, means interconnected between adjacent control channels for comparing the range and bearing of an aircraft in the different zones and for producing a control voltage when the difference in bearing angle and difference in range are both within a predetermined minimum.

10. The arrangement set forth in claim 9, in which means interconnect adjacent control channels to render one of said control channels operative to control the flight of an aircraft in said zone, when an aircraft is being controlled by the other control channel.

11. In a system of the character described, a plurality of control channels, each representing a zone, means in each of said control channels for controlling the flight of an aircraft in the corresponding zone, and means interconnected between adjacent control channels for rendering one of said control channels ineffective to control the flight of aircraft when the other control channel is not controlling the flight of aircraft.

12. In a system of the character described, a plurality of control channels, means in each of said control channels for controlling the flight of an aircraft in a corresponding zone, and means rendering one of said control channels ineffective when the other control channel is not controlling the flight of an aircraft, whereby an aircraft may fly through the zone represented by said one control channel and be controlled in a zone represented by the other control channel.

References Cited in the file of this patent

UNITED STATES PATENTS

| | | |
|---|---|---|
| 2,458,361 | Field et al. | Jan. 4, 1949 |
| 2,459,482 | Bond | Jan. 18, 1949 |
| 2,475,221 | Coley | July 5, 1949 |
| 2,480,123 | Deloraine et al. | Aug. 30, 1949 |
| 2,520,600 | Jones | Aug. 29, 1950 |
| 2,528,202 | Wolff | Oct. 31, 1950 |
| 2,539,905 | Herbst | Jan. 30, 1951 |
| 2,555,101 | Alvarez et al. | May 29, 1951 |
| 2,585,855 | Sherwin et al. | Feb. 12, 1952 |
| 2,588,930 | Kendall et al. | Mar. 11, 1952 |
| 2,636,166 | Herbst | Apr. 21, 1953 |